United States Patent

Faugeras et al.

[11] Patent Number: 5,944,905
[45] Date of Patent: Aug. 31, 1999

[54] METHOD AND APPARATUS FOR PERFORMING A CONTINUOUS REACTION WITH AT LEAST ONE LIQUID PHASE AND AT LEAST ONE SOLID CATALYST IN A PULSED COLUMN

[75] Inventors: Pierre Faugeras, Pont Saint Esprit; Françoise Laporte, Gardouch; Marie-Claude Neau, Saint Laurent des Arbres; Gabriel Roux, Meylan, all of France

[73] Assignee: Agrichimie, Le Robert, France

[21] Appl. No.: 08/849,475

[22] PCT Filed: Dec. 6, 1995

[86] PCT No.: PCT/FR95/01613

§ 371 Date: Jul. 1, 1997

§ 102(e) Date: Jul. 1, 1997

[87] PCT Pub. No.: WO96/17679

PCT Pub. Date: Jun. 13, 1996

[30] Foreign Application Priority Data

Dec. 7, 1994 [FR] France .................................. 94.14957

[51] Int. Cl.[6] .............................. B01J 3/12; C13D 3/12; B01D 15/02
[52] U.S. Cl. .................................... 127/55; 127/1; 127/9; 127/36; 210/661; 210/675; 210/676; 210/679; 422/140; 422/212; 422/213; 422/261
[58] Field of Search .............................. 127/1, 9, 36, 55; 210/661, 675, 676, 679; 422/140, 212, 213, 261

[56] References Cited

U.S. PATENT DOCUMENTS

| 4,284,511 | 8/1981 | Weitzen et al. | 210/661 |
| 4,957,627 | 9/1990 | Fortuin et al. | 210/679 |

FOREIGN PATENT DOCUMENTS

| 0 264 990 | 4/1988 | European Pat. Off. |
| 850872 | 10/1960 | United Kingdom . |
| 2 067 429 | 7/1981 | United Kingdom . |
| WO 92/10486 | 6/1992 | WIPO . |

OTHER PUBLICATIONS

D.H. Logsdail et al., "Pulsed Perforated–Plate Columns", *Handbook of Solvent Extraction*, pp. 355–372. (1991) No Month Avail.

*Primary Examiner*—David Brunsman
*Attorney, Agent, or Firm*—Young & Thompson

[57] ABSTRACT

A method and an apparatus for performing a continuous reaction with at least one liquid reaction phase incorporating at least one starting compound in the presence of at least one solid-phase catalyst, wherein the phases to be contacted are circulated through at least one pulsed reaction column (1). The liquid reaction phase is continuously fed into the middle or lower portion of the pulsed column (1), the liquid phase is circulated upwards through the pulsed column (1), and a counterflow made up of lumps (9) of a solid selective extraction compound is continuously circulated. Furthermore, each solid catalyst is continuously circulated through the pulsed column (1) in contact with the liquid phase.

21 Claims, 2 Drawing Sheets

METHOD AND APPARATUS FOR
PERFORMING A CONTINUOUS REACTION
WITH AT LEAST ONE LIQUID PHASE AND
AT LEAST ONE SOLID CATALYST IN A
PULSED COLUMN

FIELD OF THE INVENTION

The invention relates to a method and an apparatus for performing a continuous reaction with at least one liquid phase and at least one solid phase reaction catalyst in a pulsed column, and more particularly a method for placing in continuous and simultaneous contact at least one liquid reaction phase incorporating at least one starting compound with at least two solid phases consisting of at least one solid reaction catalyst and at least one solid selectively adsorbing extraction compound of a starting compound and/or a final product and/or an intermediate product or a by-product of reaction.

BACKGROUND OF THE INVENTION

Liquid phase chemical reactions requiring heterogeneous catalysis can be performed continuously in multi-contact reactors. For example, the patent application WO 92/10486 describes a method for the preparation of 5-hydroxymethyl furfural (HMF) by means of heterogeneous catalysis in liquid/liquid extraction reactors which may be pulsed columns.

The pulsed columns are vertical extraction or separation columns with horizontal plates of the disk and collar and/or collar and basket types and in which at least one solid phase is generally circulated downwards by gravity and at least one liquid phase is circulated in co-flow or in counter-flow. A pulsed column is equipped with a device capable of maintaining pulsations of the liquid phases within the column through an appropriate lining. It is known that the amplitude and the frequency of the pulsations can be regulated as a function of the respective residence times desired for the different phases in the column.

Thus, the document "Pulsed perforated-plate columns", D. H. Logsdail, M. J. Slaten, Handbook of Solvent Extraction, Teh C. Lo, Malcolm H. I. Baird, Carl Hanson, Krieger Publishing Company, Malabar, Fla., 1991, 11-2, p. 335–372, describes the general principles of pulsed columns.

OBJECTS OF THE INVENTION

In this context, the object of the invention is to suggest a method and an apparatus enabling the conversion yield of the reaction and the selectivity of production of at least one final product or intermediate of the reaction to be precisely controlled.

The object of the invention is also to suggest a method and an apparatus which enable a high productivity to be obtained, which are compatible with present environmental requirements (they produce little or no harmful effluents), inexpensive to implement, profitable irrespective of the size of the apparatus and its capacity and which allow a very large variety of starting materials to be used.

More particularly, the subject of the invention is to suggest a method and an apparatus capable of being operated at high temperatures, for short residence times and with high concentrations of starting material(s) in the liquid reaction phase.

Furthermore, the object of the invention is to suggest a method and an apparatus making it possible to perform simultaneously several chemical operations (reaction(s), extraction(s), separation(s), ...) in a single circulation step of the liquid reaction phase(s). The object of the invention is additionally to suggest a method and an apparatus by means of which the separation and extraction steps are performed continuously and more conveniently, more rapidly and less expensively than in the prior art.

More particularly, the object of the invention is to suggest a method and an apparatus for the placing in continuous and simultaneous contact of at least one liquid sugar solution with at least two solid phases, namely with at least one heterogeneous solid catalyst and at least one solid selective extraction compound.

Therefore, the object of the invention is also to suggest a method which can be made operational starting from a highly concentrated, non-crystallized sugar solution in an apparatus of small volume and with which one or more high temperature reactions may be continuously performed with a short residence time of the reaction solution in the apparatus.

More particularly, the object of the invention is to suggest a method and an apparatus for the continuous and simultaneous placing in contact of at least one sugar solution for the performance of chemical interconversion reactions of sugars with short reaction times (in particular less than two hours), high conversion yields and which allow precise control of the selectivity and purities of the final products.

SUMMARY OF THE INVENTION

In order to do this, the invention relates to a method for performing a continuous reaction with at least one liquid reaction phase incorporating at least one starting compound in the presence of at least one solid-phase catalyst, wherein the phases to be brought in contact are circulated in at least one pulsed reaction column, in which:

the liquid reaction phase or, more generally, each liquid reaction phase is continuously introduced into the middle or lower part of the pulsed column, the liquid reaction phase or, more generally, each liquid reaction phase is continuously circulated upwards in the pulsed column and the liquid reaction phase or, more generally, each liquid reaction phase is continuously recovered in the upper part of the pulsed column after passage through the pulsed column, in counterflow to the liquid reaction phase or, more generally, to each liquid reaction phase are continuously circulated lumps of at least one solid selectively adsorbing extraction compound which are introduced into the pulsed column at or above at least one outlet for the liquid reaction phase and these lumps from the pulsed column are extracted at or below at least one of the inlet for the introduction of the liquid reaction phase, the solid catalyst or, more generally, each solid catalyst is continuously circulated in the pulsed column in contact with the liquid reaction phase or, more generally, with each liquid reaction phase.

A solid compound circulating in counterflow hence constitutes at least one solid phase more than the solid phase(s) constituted by the catalyst(s).

A solid compound according to the invention circulating in counterflow is a solid selectively adsorbing (physical or chemical) extraction compound of a starting compound and/or a final product and/or intermediate product and/or a by-product of the chemical reaction performed in the pulsed column. Advantageously and according to the invention a selective extraction solid compound is a microporous solid compound constituting a molecular sieve.

The invention hence also relates to a method for placing in continuous and simultaneous contact at least one liquid reaction phase incorporating at least one starting compound with at least two solid phases consisting of at least one solid reaction catalyst and at least one solid selectively adsorbing (physical or chemical) extraction compound of a starting compound and/or of a final product and/or of an intermediate product and/or of a by-product of a reaction.

Advantageously and according to the invention, at least one solid catalyst in powder form is mixed with at least one liquid reaction phase before introduction of the mixture obtained into the pulsed column and the solid catalyst is circulated in counterflow to a liquid reaction phase or, more generally, to each liquid reaction phase. The amplitude and the frequency of the pulsations in the pulsed column is then adjusted in order that the solid catalyst circulates in stable suspension in the liquid reaction phase(s). And each solid catalyst in suspension in the liquid reaction phase(s) is recovered by filtration of the mixture extracted from the pulsed column after passage through the pulsed column.

According to the invention, the lumps of solid selective extraction compound are fragments of solid or hollow cylinders or beads whose diameter is more than ten-fold greater than the diameter of the largest particles of powdered catalyst circulating in suspension in counterflow in the liquid reaction phase(s). The lumps of solid selective extraction compound advantageously have dimensions such that the diameter of a sphere of equivalent volume is greater than 0.2 mm and may extend to several millimeters.

Advantageously and according to the invention, at least one solid catalyst is composed of a microporous solid such as a tectosilicate or a clay selected to catalyse the reaction, in particular a zeolite, and at least one solid selective extraction compound is composed of a microporous solid, such as a tectosilicate or a clay, in particular a zeolite or alumina.

Advantageously and according to the invention at least one solid selective extraction compound capable of adsorbing a reaction product is used and this reaction product is recovered by continuous extraction from the solid compound in a subsequent step, in particular during a desorption step as a result of passage through at least one stage of a pulsed extraction column.

According to the invention, it is also possible to use at least one solid selective extraction compound of an undesirable reaction by-product and the solid compound(s) obtained is regenerated by continuous calcination at the pulsed column outlet, then the lumps of solid selective extraction compound(s) of an undesirable reaction by-product are continuously recycled at the inlet of the pulsed column.

According to the invention, it is possible to regenerate at least one solid catalyst recovered after passage through the pulsed column and then to continuously recycle this solid catalyst at the inlet of the pulsed column.

According to the invention, at least one solid catalyst is circulated downwards in the pulsed column in counterflow to the liquid reaction mixture or, more generally, to each liquid reaction mixture and this solid catalyst used has a particle size different from that of each of the solid selective extraction compounds so that the solid mixture of solid catalyst and solid selective extraction compound can be separated by sieving.

As an alternative or in combination and according to the invention, a liquid extraction phase selected for its immiscibility with the liquid reaction phase or, more generally, with each liquid reaction phase and for its selective dissolution and extraction of one or more chemical compounds, in particular one or more final or intermediate reaction products, is circulated in the pulsed column.

Advantageously and according to the invention one liquid reaction phase is a sugar solution, in particular a sugar solution with an initial sugar concentration higher than 200 g/l. The pulsed column is then placed at a temperature which may be higher than 75° C., and is included in particular between 80° C. and 200° C.

The invention also relates to an apparatus for the performance of a method according to the invention. The invention thus relates to an apparatus for performing a continuous reaction with at least one liquid reaction phase incorporating at least one starting compound in the presence of at least one solid-phase catalyst, comprising:

at least one pulsed reaction column (1, 15), means (2, 10, 26) for the continuous introduction of the liquid reaction phase or, more generally, of each liquid reaction phase into the middle or lower part of the pulsed column (1, 15), means for continuously circulating the liquid reaction phase or, more generally, each liquid reaction phase upwards in the pulsed column (1, 15), means (32, 7, 27, 19) for the continuous recovery of the liquid reaction phase or, more generally, of each liquid reaction phase at the upper part (6, 17) of the pulsed column (1, 15) after its passage through the pulsed column (1, 15), means for continuously circulating in the pulsed column (1, 15) in counterflow to the liquid reaction phase or, more generally, to each liquid reaction phase lumps (9, 21) of at least one solid selectively adsorbing extraction compound, including means for the introduction of these lumps (9, 21) at or above at least one outlet (32, 27) of liquid reaction phase and means for the extraction of these lumps (9, 21) at or below at least one inlet for the introduction (10, 26) of the liquid reaction phase, means to continuously circulate the solid catalyst or, more generally, each solid catalyst in the pulsed column (1, 15) in contact with the liquid reaction phase or, more generally, each liquid reaction phase.

It should be noted that in a method and an apparatus according to the invention, at least one pulsed column serves not only as separator but also and above all as continuous multicontact reactor. In this way the reaction of at least one liquid phase with one or more solid catalysts and the extraction of at least one final and/or intermediate reaction product and/or a reaction byproduct are performed simultaneously and continuously in the pulsed column in a single step.

In this respect it should be noted that the combined characteristics of the invention enable this result to be obtained owing to the fact that it is possible to work with concentrated syrups (more than 65 on the Brix scale) at high temperatures and short reaction times, since the reaction conditions (in particular the simultaneous adsorption) displace the equilibrium considerably.

The invention relates in addition to a method and an apparatus comprising in combination all or part of the characteristics mentioned hitherto or hereafter.

Other characteristics and advantages of the invention will become apparent after reading the following description which refers to the appended figures in which:

BRIEF DESCRIPTION OF THE INVENTION

FIG. 1 is a diagram illustrating an apparatus for carrying out a first variant of a method according to the invention, FIG. 2 is a diagram illustrating an apparatus for carrying out a second variant of a method according to the invention, FIG. 3 is a diagram illustrating an apparatus for carrying out a third variant of a method according to the invention.

DETAILED DESCRIPTION OF THE INVENTION

Figure 1:
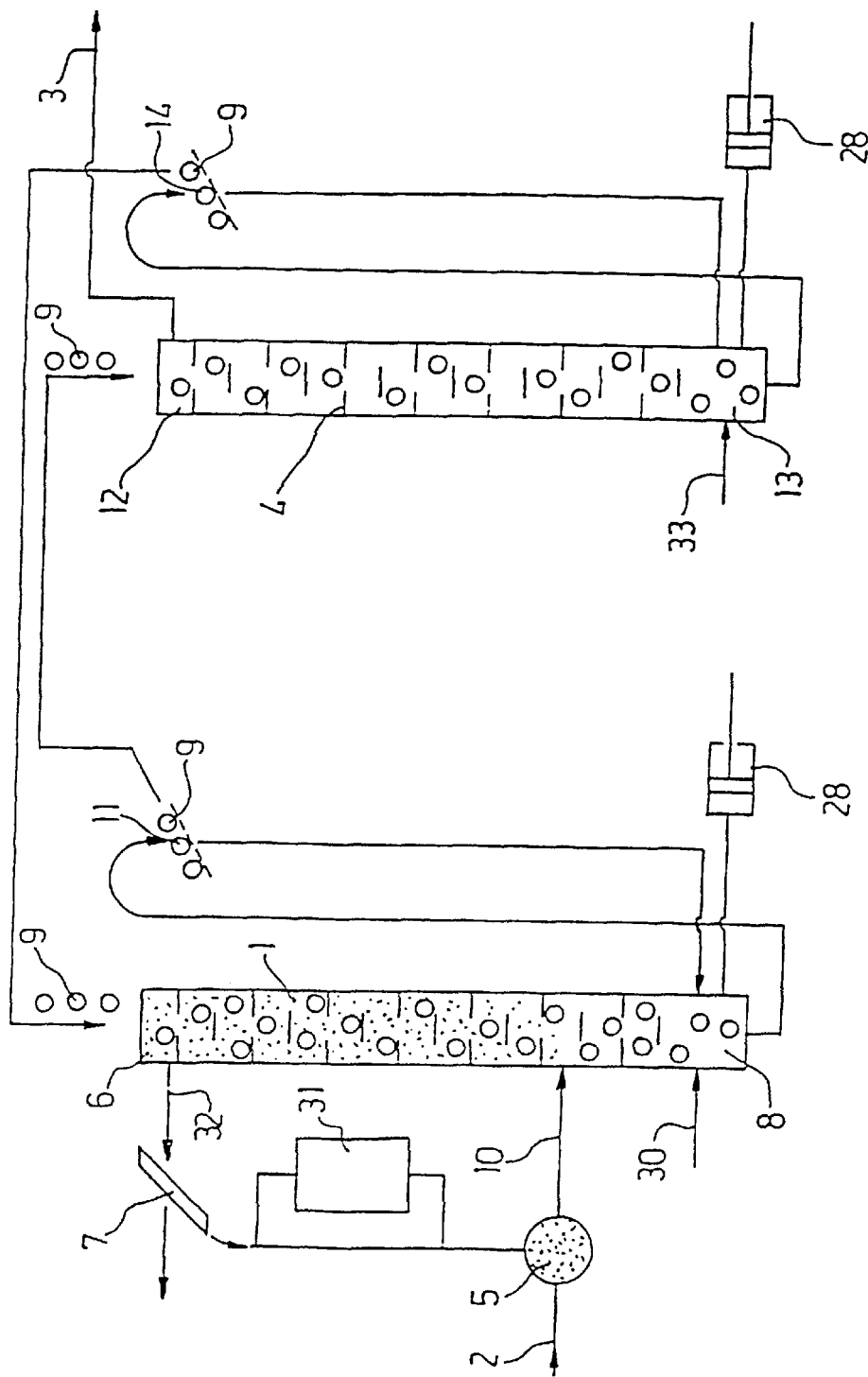

FIG. 1 shows an apparatus comprising a first pulsed column 1 in which is performed a conversion reaction on a liquid reaction solution fed into 2, for the purpose of obtaining a final product at outlet 3 of the apparatus. The apparatus contains in addition a second pulsed column 4 for extraction of the final product situated downstream from the first pulsed reaction column.

The pulsed columns are known vertical multi-contact devices in which it is possible to maintain pulsations of liquid phases owing to an appropriate device 28. For example, the lining of the pulsed columns 1 and 4 is of the disks and collars and/or baskets and collars type.

At least one solid catalyst in powder form is mixed in a mixer 5 with the liquid reaction solution before its introduction into the pulsed column 1. The mixture is introduced through an introduction inlet 10 in the middle or lower part of the pulsed column 1 and circulates downwards in the interior of this pulsed column 1.

The amplitude and the frequency of the pulsations of the pulsed reaction column 1 are determined, adjusted and controlled in order that the solid powder catalyst circulates continuously in stable suspension in the liquid solution, i.e. at the same time as does the latter through the pulsed column 1. The same holds for the lining in the pulsed column 1 which is defined and dimensioned in order to maintain this circulation. The mixture composed of the liquid reaction solution and the solid catalyst dispersed in stable suspension is recovered through an outlet 32 in the upper part 6 of the pulsed column 1, then passed through a filter 7 which separates the liquid and solid phases. At the filter outlet 7, the solid powder phase constituting the catalyst may be recovered directly or as the result of a regeneration step 31 (calcination) and recycled in the mixer 5 at the pulsed column inlet 1. The liquid phase may be passed through one or more subsequent stages of the pulsed reaction column and/or treated (separation, concentration, purification, . . . ) and/or at least partially recycled and/or eliminated.

In the lower part 8 of the pulsed column 1, a low, continuous throughput of solvent, in particular water or an aqueous solution, is introduced at 30.

Lumps 9 of at least one solid selective extraction compound are continuously circulated in the pulsed column 1 in counterflow to the liquid reaction solution. The lumps 9 are introduced into the upper part 6 of the pulsed column, immediately above the outlet 32 of the liquid reaction solution. In the example shown in FIG. 1 and according to the invention a solid selective extraction compound consisting of a molecular sieve capable of adsorbing the desired final product obtained by means of the reaction performed in the pulsed column 1 is used.

Thus, this final product is adsorbed continuously as it is formed during the passage of the liquid reaction solution through the pulsed reaction column 1.

The lumps 9 of solid selective extraction compound continuously circulate downwards by gravity in the pulsed reaction column 1 and are extracted at the lower part 8 of this column 1, i.e. below the introduction inlet 10 for the liquid reaction solution into the pulsed column 1. The lining of the pulsed column 1, the amplitude and the frequency of the pulsations are also determined in order to maintain this continuous circulation. In the lower part 9 of the pulsed column 1, the lumps 9 of solid compound are hence loaded with the final reaction product. The lumps 9 of solid compound recovered in the lower part 8 are conveyed by a hydraulic lift device to a sieve 11, then introduced into the upper part 12 of the second pulsed column 4 which is an extraction column. In this column 4, a liquid solvent circulates in counterflow to the lumps 9 of solid compound, i.e. upwards. This solvent is introduced at 33 into the lower part 13 of the column 4 and recovered in the upper part 12 of the column 4 loaded with the final product initially adsorbed onto the solid compound 9. The liquid solvent loaded with the final reaction product is thus recovered at outlet 3 in high purity.

The lumps 9 of solid compound continuously circulate downwards by gravity in the column 4 and are recovered in the lower part 13 and conveyed by an hydraulic lift device to a sieve 14 which separates them from the residual liquid phase.

These lumps 9 of solid compound may be recycled either directly or after a regeneration step (calcination) to the upper inlet 6 of the first pulsed reaction column.

In the apparatus shown in FIG. 1, it should be noted that the lumps 9 of solid compound circulate downwards by gravity in each of the pulsed columns land 4. On the other hand, the liquid reaction solution mixed with the powdered catalyst circulates upwards in the pulsed reaction column 1. As an alternative not shown, it is also possible to use a preformed catalyst, in particular extruded in lumps circulating downwards in counterflow to the liquid phase.

Advantageously, the lumps 9 of solid selective extraction compound are fragments of solid or hollow cylinders or beads whose diameter is more than ten times greater than the diameter of the largest particles of powdered catalyst used in the pulsed column 1 in suspension in the liquid reaction solution.

The lumps 9 of solid compound have for example a mean diameter which is greater than 1 mm and which may extend to several millimeters.

For example, the solid catalyst is a powdered zeolite and the lumps 9 of solid compound are composed of lumps of an extruded adsorbent zeolite selected to constitute a molecular sieve for at least one final reaction product.

The temperature of the pulsed reaction column 1 is controlled by an appropriate device. In particular, it is possible to maintain distinct zones of temperature within the pulsed column 1; for example, with at least one temperature zone promoting selective adsorption by the solid compound and at least one, temperature zone promoting catalysis.

Such an apparatus shown in FIG. 1 may be used for example for the isomerization of hexoses by means of heterogeneous catalysis and for example for the isomerization of aldohexoses (in particular glucose) into ketohexoses (in particular fructose).

The catalyst is then a heterogeneous catalyst of basic character capable of catalyzing the isomerization reaction. The solid selective extraction compound is selected in order to constitute a molecular sieve for the desired hexoses, in particular ketohexoses (and, more particularly, fructose).

It is also possible to continuously circulate in the pulsed reaction column in coflow or counterflow a liquid extraction phase immiscible with the liquid reaction and capable of selective dissolution and extraction of one or more chemical compounds. For example, it is possible to circulate MIBK (methylisobutylketone), in order to dissolve and extract the HMF produced continuously, or any other organic solvent insoluble in water.

With the apparatus of FIG. 1 a specific total flow rate of 1 to 5 l/h/cm² is used, for example.

Figure 2:
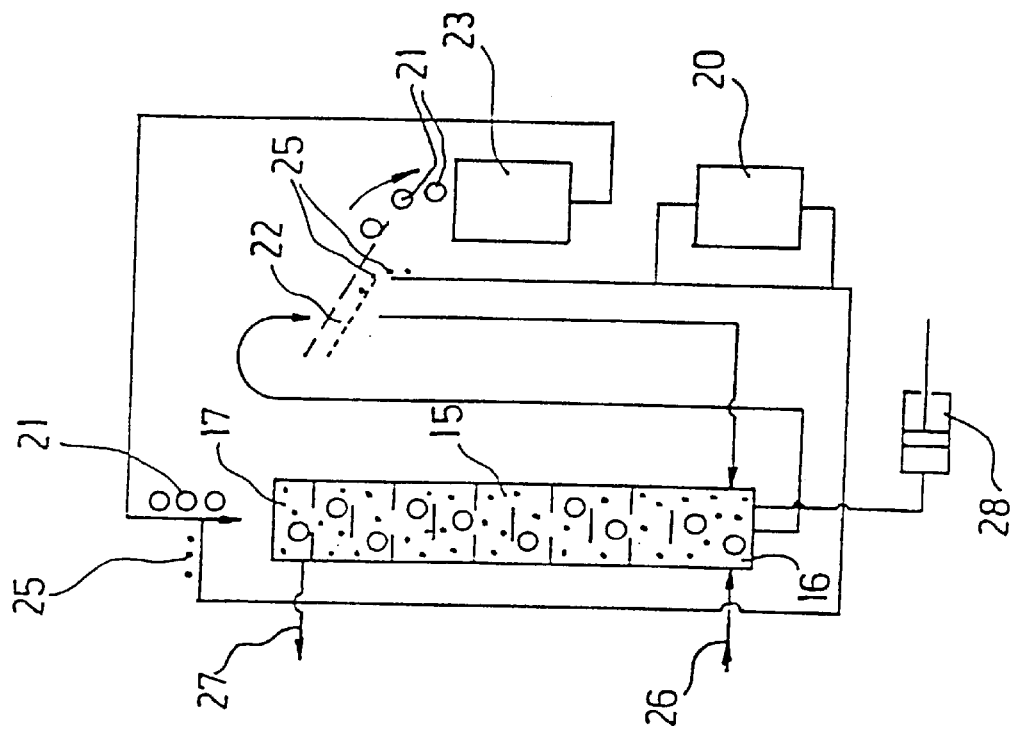

In FIG. 2, the apparatus for carrying out the method according to the invention is composed essentially of a pulsed reaction column 15 with its device 28 capable of maintaining pulsations and at the lower part 16 of which a liquid reaction solution is introduced at 26. Reaction products are extracted at the upper part 17 of the pulsed column 15 through an outlet 27.

Before its introduction into the lower part 16 of the pulsed column 15, the liquid reaction solution is mixed with at least one heterogeneous powdered catalyst in a mixer 18. The liquid solution with the catalyst dispersed in stable suspension circulates upwards in the pulsed column 15.

In the upper part 17, the liquid solution and the catalyst are recovered and separated from each other by means of a filter 19. The powdered catalyst recovered at the filter outlet 19 is recycled in the mixer 18 either directly if it is still active or after a regeneration step by passage through a calcination oven 20.

In addition, lumps 21 of one or more solid adsorbent compounds, which circulate downwards by gravity in the column 15, are continuously introduced into the upper part 17 of the column 15. The lumps 21 of solid compound are recovered at the lower part 16 of the column 15.

The lumps 21 of adsorbent solid compound are, for example, in the form of granules or cylinders constituting an adsorbent molecular sieve for an undesired reaction by-product. The adsorbent solid compound must quite obviously be compatible with the catalyst used for the reaction performed in the pulsed column 15.

In particular, the adsorbent solid compound must not neutralize the acidity or basicity of the catalyst. The lumps 21 of adsorbent solid compound recovered in the lower part 16 of the column 15 are transported by a device constituting an hydraulic lift to a sieve 22 enabling the lumps 21 of the solid compound 21 to be isolated from the residual liquid phase. The lumps 21 are then introduced into a calcination oven 23 in which the adsorbent compound(s) are regenerated, the products trapped in the pores of the lumps 21 of the adsorbent compound being incinerated.

At the calcination oven outlet 23 the lumps 21 of adsorbent solid compound are continuously recycled and reintroduced at the upper part 17 of the column 15. The reaction products are obtained in solution at the outlet 24 of the filter 19, after separation from the solid phase constituted by the catalyst.

It should be noted that such an apparatus is extremely simple in principle and in its operation. The temperature at the interior of the pulsed column can be adjusted and regulated. The proportions by weight, the flow rates and rates of circulation of starting solution, catalyst(s) and adsorbent compound(s) are regulated in order to optimize the conversions and/or the selectivities desired.

Such an apparatus can be used, for example, for the hydrolysis of compound sugars to simple sugars. In that case a zeolite Y is used in the acidic, freshly calcined, powdered, protonated form as catalyst and an extruded zeolite Y in the protonated form in the form of granules or cylinders as solid selective extraction compound. In this apparatus it is possible to maintain the reaction temperature between 80° and 85° C. and to use a liquid starting solution, in particular an aqueous solution, with a high concentration of compound sugars. The adsorbing compound is for example selected to adsorb the hydrolysis residues and in particular hydroxymethyl furfural (HMF). It is also possible, as a variant or in combination, to circulate a solvent immiscible with the solution. For example, it is possible to circulate MIBK, capable of extracting unadsorbed HMF.

It is also possible to use the apparatus shown in FIG. 2 for example to prepare a pure solution of glucose and fructose starting from a starting liquid solution of sucrose in the presence of a microporous solid catalyst and of a selective adsorbent of the by-products such as HMF and other colored products.

Figure 3:
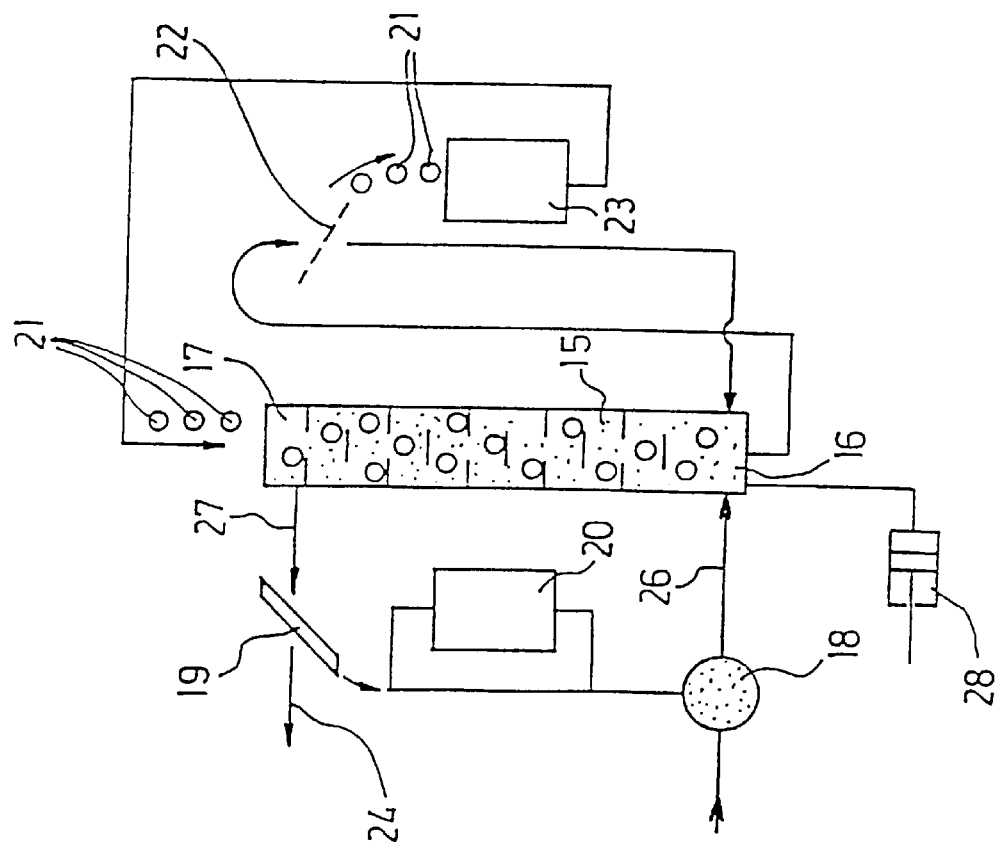

The variant shown in FIG. 3 differs from that of FIG. 2 only in the fact that the catalyst is no longer introduced in coflow with the liquid starting solution but circulates in counterflow simultaneously with the adsorbent compound 21. The solid catalyst 25 is then not in powder form but in the form of granules and/or beads and/or cylinders in order to be able to circulate by gravity through the pulsed column 15, from the upper part 17 to the lower part 16. The heterogeneous catalyst 25 is recovered with the lumps 21 of adsorbent compound at the lower part 16 of the column 15, then transported by hydraulic lift to the sieve 22 which is in this variant a double sieve permitting the separation of the beads and/or granules and/or cylinders 25 of solid catalyst from the granules and/or cylinders 31 of adsorbent compound. In order to do this according to the invention the particle size of the solid catalyst 25 is different from that of the adsorbent compound 21. In the example shown, and according to the invention, the solid catalyst has a particle size less than that of the adsorbent compound 21.

At the outlet of the sieve 22, the lumps 25 of solid catalyst are either directly reintroduced at the upper part 17 of the column 15 if they are still active, or regenerated by passage through a calcination oven 20 before being recycled to the upper part 17 of the column 15. The lumps 21 of adsorbent compound follow the same circuit as that described in reference to FIG. 2.

The initial liquid reaction solution is directly introduced at 26 into the lower part 16 of the column 15 and circulates upwards in the column 15. At the upper part 17, the liquid solution which has undergone reaction is recovered at 27 directly. In this variant it should be noted that the operations shown in FIG. 2 of mixing in the mixer 18 and of filtration through the filter 19 are eliminated.

Here again, this apparatus can be used to convert an aqueous solution of compound sugars into a pure aqueous solution of simple sugars free of HMF.

The apparatus shown in FIG. 3 can also be used for example for the preparation of a solution of pure ketohexose starting from a solution containing at least one aldohexose or a glycoside capable of generating at least one aldohexose in the presence of at least one microporous solid catalyst and one selective adsorbent for aldohexoses.

The method and the apparatus according to the invention can also be used to perform continuously other chemical reactions than those mentioned above.

We claim:

1. Method for performing a continuous reaction with at least one liquid reaction phase incorporating at least one starting compound in the presence of at least one catalyst, and through at least one pulsed reaction column, the method comprising:

continuously introducing each liquid reaction phase into a middle or lower part of the pulsed column;

continuously circulating each liquid reaction phase upwards in the pulsed column and continuously recovering each liquid reaction phase in an upper part of the pulsed column after its passage through the pulsed column;

continuously circulating in the pulsed column in counterflow to each liquid reaction phase lumps of at least one solid selectively adsorbing extraction compound, which are introduced into the pulsed column at or above at least one outlet for the liquid reaction phase and which are extracted from the pulsed column at or below at least one introduction inlet for the liquid reaction phase; and continuously circulating at least one solid phase catalyst in contact with each liquid reaction phase in the pulsed column.

2. Method according to claim 1, wherein at least one solid catalyst in powdered form is mixed with at least one liquid reaction phase before introduction into the pulsed column.

3. Method according to claim 2, wherein the amplitude and the frequency of the pulsations of the pulsed column are adjusted so that the solid catalyst circulates in stable suspension in the liquid reaction phase.

4. Method according to claim 2, wherein each solid catalyst in suspension in a liquid reaction phase is recovered by filtration after passage through the pulsed column.

5. Method according to claim 1, wherein at least one liquid reaction phase incorporating at least one starting compound is placed continuously and simultaneously in contact in the pulsed column with at least two solid phases consisting of at least one solid reaction catalyst and lumps of at least one solid selectively adsorbing extraction compound of a final product and/or intermediate product and/or a reaction by-product.

6. Method according to claim 5, wherein the lumps of solid selective extraction compound are fragments of cylinders or beads whose diameter is more than ten-fold greater than the diameter of the largest particles of catalyst.

7. Method according to claim 6, wherein the lumps of solid selective extraction compound have a mean diameter greater than 0.2 mm.

8. Method according to claim 1, wherein at least one solid catalyst is a tectosilicate or a clay selected to catalyze the reaction, and wherein at least one solid selective extraction compound is a tectosilicate, a clay or alumina.

9. Method according to claim 1, wherein at least one extruded zeolite is used as the solid extracted extraction compound.

10. Method according to claim 1, wherein at least one solid selective extraction compound capable of adsorbing a reaction product is used, and wherein the reaction product is recovered by continuous extraction from the solid compound in a subsequent step.

11. Method according to claim 10, wherein a solid selective adsorption compound of a reaction product is used, and wherein the reaction product is recovered during a desorption step as a result of passage through at least one stage of the pulsed column.

12. Method according to claim 1, wherein at least one solid selective extraction compound of an undesirable reaction by-product is used, and a solid compound obtained at an exit of the pulsed column is continuously regenerated by calcination, and wherein the solid selective extraction compound of an undesirable reaction by-product is then recycled to the inlet of the pulsed column.

13. Method according to claim 1, wherein at least one solid catalyst recovered after passage through the pulsed column is regenerated, and then continuously recycled to the inlet of the pulsed column.

14. Method according to claim 1, wherein at least one solid catalyst is circulated downwards in the pulsed column in counterflow to each liquid reaction phase, and wherein this solid catalyst used has a particle size different from that of each solid selective extraction compound so that a solid mixture of solid catalyst and solid selective extraction compound can be separated by sieving.

15. Method according to claim 1, wherein a liquid extraction phase selected for its immiscibility with each liquid reaction phase and for its selective dissolution and extraction of one or more chemical compounds is continuously circulated in the pulsed column.

16. Method according to claim 1, wherein the liquid reaction phase is a sugar solution.

17. Method according to claim 16, wherein the sugar solution has an initial sugar concentration higher than 200 g/l.

18. Method according to claim 1, wherein the pulsed reaction column is placed at a temperature higher than 75° C.

19. Method according to claim 18, wherein the pulsed reaction column is placed at a temperature ranging between 80° C. and 200° C.

20. Method for performing a continuous reaction with at least one liquid reaction phase incorporating at least one starting compound in the presence of at least one catalyst, and through at least one pulsed reaction column, the method comprising:

continuously introducing each liquid reaction phase into a middle or lower part of the pulsed column;

continuously circulating each liquid reaction phase upwards in the pulsed column and continuously recovering each liquid reaction phase in an upper part of the pulsed column after its passage through the pulsed column;

continuously circulating in the pulsed column in counterflow to each liquid reaction phase lumps of at least one solid selectively adsorbing extraction compound, which are introduced into the pulsed column at or above at least one outlet for the liquid reaction phase and which are extracted from the pulsed column at or below at least one introduction inlet for the liquid reaction phase; and continuously circulating at least one solid phase catalyst in contact with each liquid reaction phase in the pulsed column;

wherein the amplitude and the frequency of the pulsations of the pulsed column are adjusted so that the solid catalyst circulates in stable suspension in the liquid reaction phase.

21. Apparatus for performing a continuous reaction with at least one liquid reaction phase incorporating at least one starting compound in the presence of at least one catalyst, comprising:

at least one pulsed reaction column;

means for continuously introducing each liquid reaction phase in a middle or lower part of the pulsed column;

means for continuously circulating each liquid reaction phase upwards in the pulsed column;

means for continuously recovering each liquid reaction phase at an upper part of the pulsed column after passage through the pulsed column;

means for continuously circulating in the pulsed column in counterflow to each liquid reaction phase lumps of at least one solid selectively adsorbing extraction compound, including means for introducing said lumps at or above at least one outlet of the liquid reaction phase, and means for extracting said lumps at or below at least one inlet for the introduction of the liquid reaction phase; and means for continuously circulating at least one solid-phase catalyst in the pulsed column in contact in coflow with each liquid reaction phase.

* * * * *